United States Patent [19]
Andrews

[11] Patent Number: 5,777,319
[45] Date of Patent: Jul. 7, 1998

[54] METHOD OF ROTATIONALLY ALIGNING MULTISPOT DIODE LASERS IN RASTER OUTPUT SCANNERS

[75] Inventor: John R. Andrews, Fairport, N.Y.

[73] Assignee: Xerox Corporation, Stamford, Conn.

[21] Appl. No.: 827,077

[22] Filed: Mar. 26, 1997

[51] Int. Cl.⁶ ........................................... G02F 1/01
[52] U.S. Cl. .................. 250/225; 250/205; 372/27
[58] Field of Search ........................ 250/225, 205, 250/235, 236, 548; 359/216, 217; 372/27, 24; 347/235, 236, 239

[56] References Cited

U.S. PATENT DOCUMENTS

| | | | |
|---|---|---|---|
| 4,011,448 | 3/1977 | Hordeski | 250/237 R |
| 4,796,964 | 1/1989 | Connell | 359/206 |
| 5,233,188 | 8/1993 | Arimoto et al. | 250/225 |
| 5,357,536 | 10/1994 | Andrews | 372/50 |
| 5,422,905 | 6/1995 | Andrews | 372/50 |
| 5,574,491 | 11/1996 | Paoli | 347/248 |

*Primary Examiner*—Que Le
*Attorney, Agent, or Firm*—Michelle W. Waites

[57] ABSTRACT

A method of accomplishing rotational alignment of laser arrays relative to an external optical axis is described. The method uses the laser polarization, which is oriented relative to the axis of the array, as the means of determining the laser array rotational orientation. The method can be rapidly executed in a manual or automatic procedure, has accuracy of better than 0.1 degree, and can be used to orient a laser array at any chosen angle with reflect to an external optical axis.

20 Claims, 7 Drawing Sheets

METHOD OF ROTATIONALLY ALIGNING MULTISPOT DIODE LASERS IN RASTER OUTPUT SCANNERS

The present invention is directed to a process for manufacturing a raster output scanner (ROS) equipped with a multispot diode laser.

More specifically, the present invention is directed to a method of accurately aligning the rotational positioning of a multispot laser beam with respect to the axis of a ROS scan line.

BACKGROUND OF THE INVENTION

The xerographic imaging process begins by charging a photoconductive member to a uniform potential, and then exposing a light image of an original document onto the surface of the photoconductor, either directly or via a digital image driven laser. Exposing the charged photoconductor to light selectively discharges areas of the surface while allowing other areas to remain unchanged, thereby creating an electrostatic latent image of the document on the surface of the photoconductive member. A developer material is then brought into contact with the surface of the photoconductor to transform the latent image into a visible reproduction. The developer typically includes toner particles with an electrical polarity opposite that of the photoconductive member. A blank copy sheet is brought into contact with the photoreceptor and the toner particles are transferred thereto by electrostatic charging the sheet. The sheet is subsequently heated, thereby permanently affixing the reproduced image to the sheet. This results in a "hard copy" reproduction of the document or image. The photoconductive member is then cleaned to remove any charge and/or residual developing material from its surface to prepare it for subsequent imaging cycles.

Electrophotographic printers which operate by projecting a laser scan line onto a photoconductive surface are well known. In printers such as these, it is common to employ a raster output scanner (ROS) as a source for signals to be imaged on the photographic member. The ROS provides a laser beam which switches on and off according to electronic image data associated with the image to be printed as the beam moves, or scans, across the charged photoreceptor. Diode lasers are one common means of generating the laser beam that is used to scan in a ROS system. The image data is driven in serial fashion to reproduce each line in the image. Modulation of the scanning beam is typically implemented by digitally controlling the output of the light beam or a modulator associated with a continuous laser source. Another method of modulating the beam involves rotating a polygon mirror and reflecting the laser beam from its surface. Using this method, the modulator causes the beam to emit light to discharge the surface of the photoreceptor in locations which are to remain blank in the original document.

As printing speed increases, it becomes more and more difficult to modulate the laser beam at the required rate. When the rotating mirror modulation method is used, the rate at which the beam is modulated can be varied with the speed of the rotating mirror. However, the effects of modulating the beam in this manner can be very limiting since rotating the mirror at exceptionally fast rates requires the presence of an expensive high powered motor and associated bearings. Thus, it is advantageous to devise a method of discharging the photoreceptor at high rates of speed without having to dramatically increase the rate at which the polygon mirror is rotated.

One successful way to increase the photoreceptor discharging rate is to employ multiple or "multispot" diode lasers. A multispot diode laser is a single device that has a plurality of closely spaced semiconductor lasers. The use of multispot diode lasers enables two or more independently addressable laser beams to be modulated together, thereby increasing the number of scan lines that are discharged across the photoreceptor during a single sweep. This enables high speed operation at resolutions that are not attainable using other practical methods.

In order to properly discharge the photoreceptor to obtain an accurate reproduction of the original image, multispot diodes must be properly aligned relative to the scan axis before modulation of the laser beams takes place. Ideal alignment typically occurs when the axis joining the lasers is positioned exactly perpendicular to the scan line. If the lasers are not aligned in this manner, the wrong locations will be discharged as the beams travel across the surface of the photoreceptor. This erroneous discharging will be magnified when the laser is imaged through the ROS, because the imaging system is anamorphic. That is, the amount that the image is magnified in one direction (here the fast scan direction) is substantially greater than the magnification that occurs in the other (slow scan) direction. This differential magnification along the two axes of the ROS gives rise to significant distortion of the resulting image.

Present diode laser alignment methods include providing predetermined positioning tolerances to the completed assembly such that markers located on the exterior of the package are sufficient to provide the proper alignment. Unfortunately these methods have been somewhat unsuccessful, largely because it is virtually impossible to satisfy these very strict position tolerancing requirements which must be met if the image is to survive the magnification that occurs during imaging. Thus it is necessary to provide a more accurate method of properly aligning multispot diode lasers in a ROS. The present invention provides such a method.

The following disclosures may be relevant to various aspects of the present invention:

U.S. Pat. No. 5,574,491 to Paoli issued Nov. 12, 1996 discloses an apparatus for controlling spot position in an output device employing a linear array of light sources. In a raster scanning optical output device, such as a laser printer or the like, an array of independently addressable light emitting devices, such as an array of solid state lasers, is used to control spot position on an image plane in the slow scan direction. The array is disposed such that the spots emitted from each element of the array strike the image plane displaced in the slow scan direction from one another. The total distance between all the spots is less than the distance between fast scan direction scan lines. Only a single element of the array is operated per scan line, thus only a single spot is formed on the image plane per scan line. Control of which of the elements of the array emits a light beam per scan line allows control of the spot position in the slow scan direction for that scan line.

Andrews U.S. Pat. No. 5,422,905 issued Jun. 6, 1995 discloses a method and apparatus for fabricating a dual beam semiconductor laser, wherein the laser includes first and second semiconductor laser dies respectively fixed to one another while separated by intervening alignment structures. The alignment structures provide accurate placement of the dual laser beams with respect to one another while also assuring thermal isolation of the diode lasers. The fabrication method employs photolithographic techniques to accurately position the alignment structures across an entire semiconductor wafer, thereby assuring accuracy in alignment of the assembled dual beam lasers. As a result, the need for multiple-step alignment operations commonly employed in the production of multiple diode laser devices is eliminated.

Andrews U.S. Pat. No. 5,357,536 issued Oct. 18, 1994 discloses a method and apparatus for fabricating a multiple beam semiconductor laser array. Accurate alignment of the lasers and control of interlaser spacing is achieved through the use of alignment structures formed on the mounting surface of the supporting heatsink. Once assembled, the alignment structures remain in an abutting relationship with the ridge waveguides that are present on each of the semiconductor lasers.

U.S. Pat. No. 4,796,964 to Connell issued Jan. 10, 1989 discloses Plural overlapped Gaussian-shaped solid state semiconductor laser beams are focused onto the recording medium surface of a printer and will not optically interfere and cause any non uniformity in printing due to optical interference because the respective laser beams are discussed in ON/OFF operation so that relative to two or more overlapping laser beam spots focused to a recording medium surface, only one laser beam will be on at a given time.

U.S. Pat. No. 4,011,448 to Hordeski issued Mar. 8, 1977 discloses an electronic digital linear shaft encoder which is readily adaptable to a variety of different equipment using different mounting configurations. The encoder mechanism provides an alignment system within a self-contained unit for aligning a transparent, coded, dimension measuring grid within a photooptical system for assuring that proper alignment will be maintained between the measurement grid and the photooptical system to avoid erroneous output signals and thereby assure reliable performance of the encoder unit. In one embodiment, the photooptical system rigidly mounted within the housing comprises a plurality of light emitting diodes aligned with a plurality of light sensitive transistors.

All of the references cited herein are incorporated by reference for their teachings.

Accordingly, although known apparatus and processes are suitable for their intended purposes, a need remains for developing ways to insure the accurate reproduction of images produced by a xerographic printer.

Further, there is a need for a method and apparatus for aligning multiple spot diodes for use in a raster output scanning system.

SUMMARY OF THE INVENTION

In accordance with the present invention, there is provided a method of aligning a laser transmission device for use in a raster output scanner, which includes determining a polarization direction of the laser transmission device; locating an inter-beam axis of the laser transmission device; aligning said inter-beam axis with respect to said polarization direction; mapping a path traveled by a laser beam as said beam is transmitted from the laser transmission device to a rotating polygon; placing a polarizer in said path in a direction dependent upon said polarization determination step, such that said polarizer is oriented orthogonal to said laser transmission device polarization direction; detecting a light intensity of said laser beam passing through said polarizer; and adjusting a rotational placement of the laser transmission device by an angle dependent upon said light intensity, thereby regulating a transmission of light through said polarizer to insure that the laser transmission device is properly aligned for imaging.

In accordance with another aspect of the invention, there is provided an apparatus for aligning a laser transmission device for use in a raster output scanner, including: a rotating polygon with a reflective surface; a laser beam transmitted along a path from the laser transmission device to said rotating polygon; a polarizer placed in said path between the laser transmission device and said rotating polygon in a direction orthogonal to a polarization direction of the laser transmission device; a detector which measures an intensity of light transmitted through said polarizer; a processor which determines a required rotation of the laser transmission device to regulate said measured light intensity; and an actuator which performs said laser transmission device rotation.

In accordance with yet another aspect of the present invention there is provided an apparatus for aligning a laser transmission device for use in a raster output scanner, which includes: means for determining a polarization direction of the laser transmission device; means for locating an inter-beam axis of the laser transmission device; means for aligning said inter-beam axis with respect to said polarization direction; means for mapping a path traveled by a laser beam as said beam is transmitted from the laser transmission device to a rotating polygon; means for placing a polarizer in said path in a direction dependent upon said polarization determination step, such that said polarizer is oriented orthogonal to said laser transmission device polarization direction; means for detecting a light intensity of said laser beam passing through said polarizer; and means for adjusting a rotational placement of the laser transmission device by an angle dependent upon said light intensity, thereby regulating transmission of light through said polarizer and insuring that the laser transmission device is properly aligned for imaging.

The present invention has significant advantages over current methods and apparatus for aligning laser beams in a ROS. First, it enables multiple laser beams to be used in a single polygon imaging system, to dramatically increase the speed at which discharging of the photoreceptor takes place. Also, it provides a precise method of aligning these beams, to insure that the image reproduced is an accurate duplicate of the original document.

BRIEF DESCRIPTION OF THE DRAWINGS

Other features and advantages of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

The present invention is directed to a method of improving the quality of an image that is generated by a raster output scanning device. Specifically the present invention relates to a method of accomplishing rotational alignment of diode lasers relative to an external optical axis.

Figure 1:
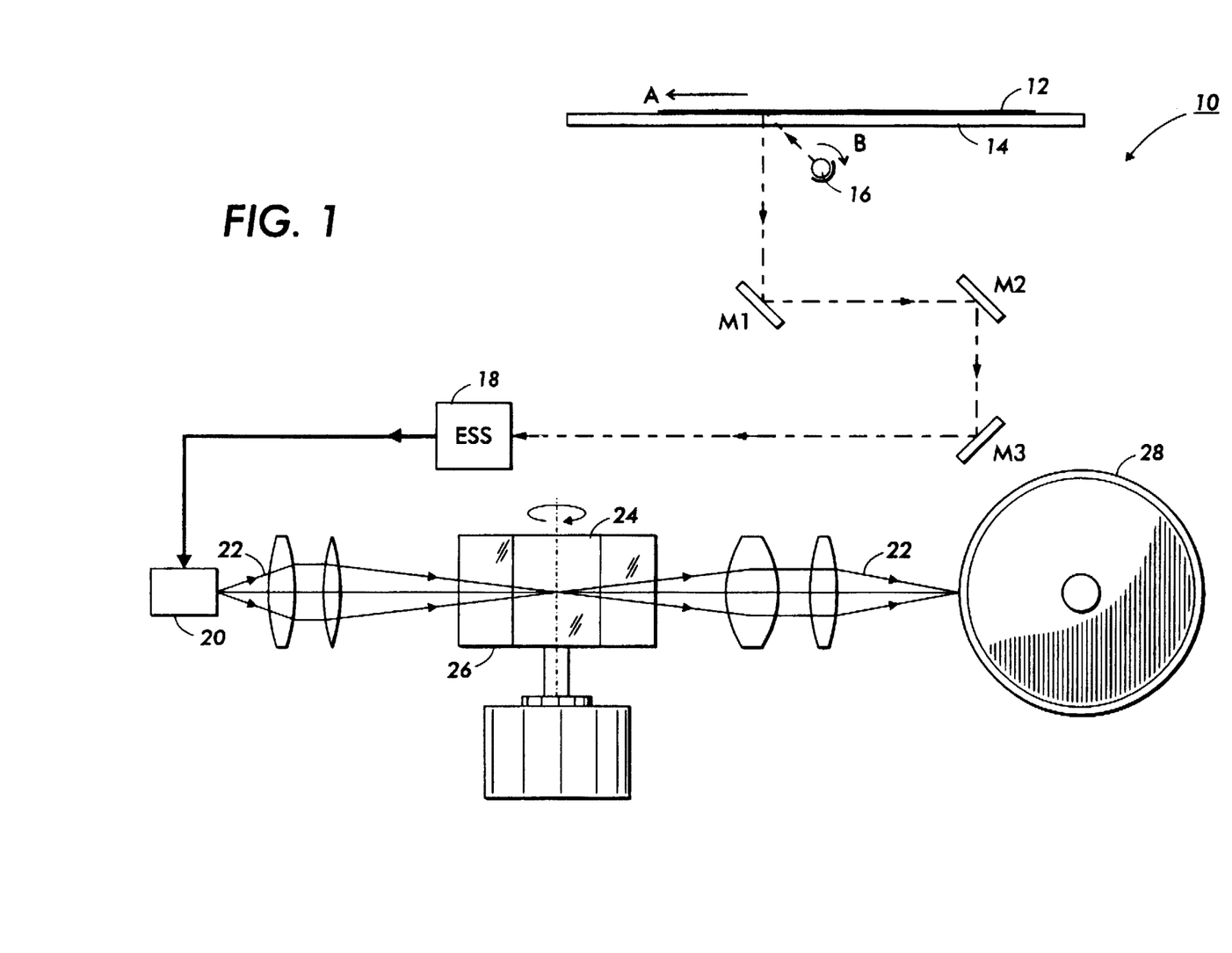
FIG. 1 is a schematic side view of one type of xerographic imaging machine which incorporates a raster output scanner.

Referring now to the drawings where the showings are for the purpose of describing an embodiment of the invention and not for limiting same. FIG. 1 depicts a scanner, one type of device that often contains a raster output scanning (ROS) system 10 in which the present invention may be used. A typical scanning operation begins by placing a document 12 face down upon platen 14. Platen 14 and a light source 16 are placed in relative motion to cause scanning of document 12 by the light source. This scanning causes a small strip of light to extend across document 12 in the direction known as the fast scan direction. The illuminated portion of the image on document 12 is reflected through the illumination cavity and into an electronic subsystem 18 which converts the illumination data into digital signals. These digital signals are then transmitted as laser beam 22 from diode source 20 onto a rotating polygon 24 which has at least one mirrored facet 26. The rotation of the mirrored facets causes the laser beam to be deflected and thereby scanned across a photosensitive image member which is shown as a photoreceptor drum 28. While a scanner is used here to describe the invention, those skilled in the art will recognize that numerous sources are available for illuminating the surface of document 12, and the invention is not limited to this embodiment.

Figure 2:
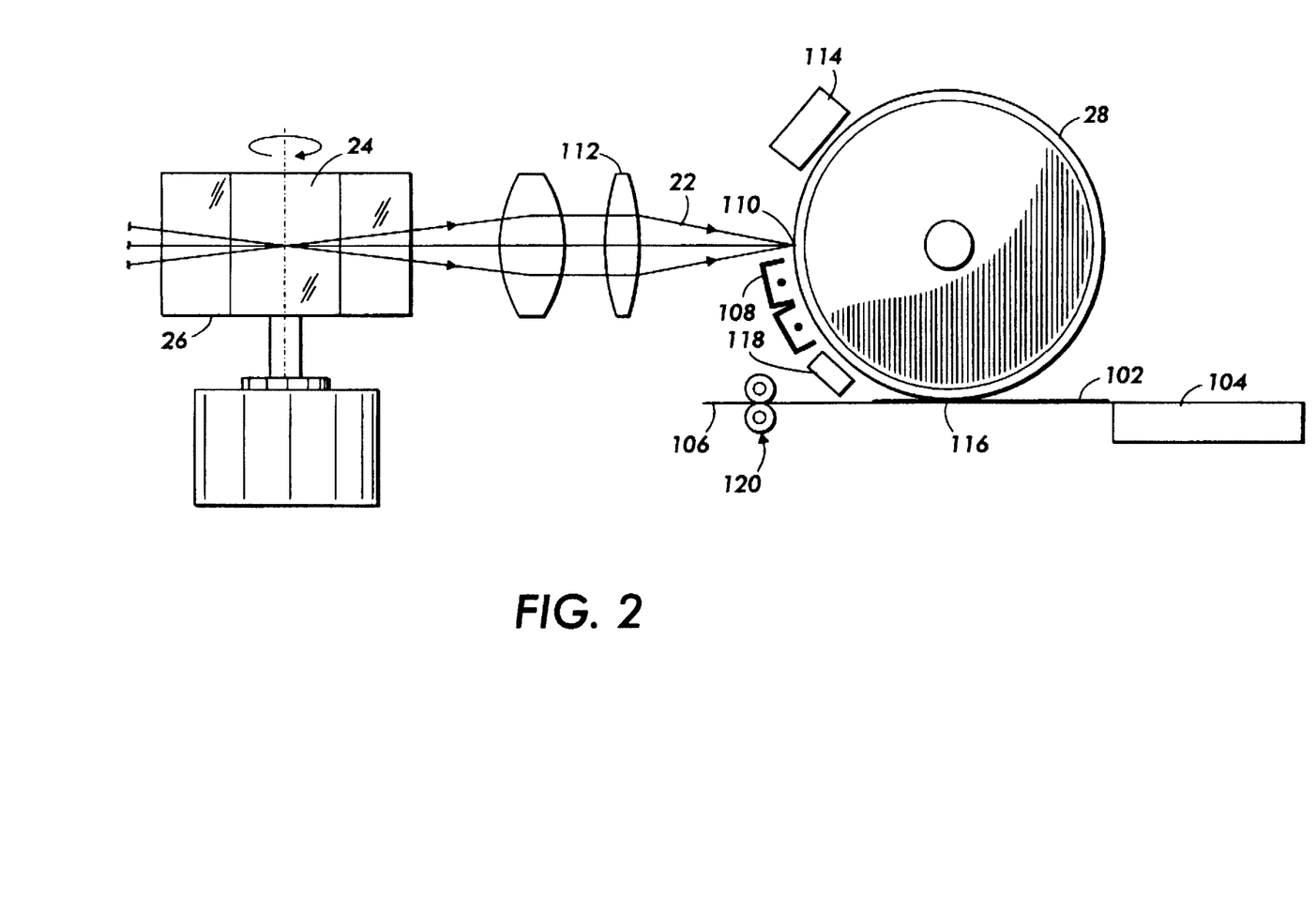
FIG. 2 contains a detailed illustration of a raster output scanner, in which the present invention may be used.

As shown in FIG. 2, blank copy sheets 102 are stored in paper tray 104 for entry into paper path 106. Photoreceptor drum 28 rotates clockwise through a charging station 108 which includes a corona discharge device, and exposure station 110 where beam 22 from rotation polygon 24 passing through a toroidal lens 112 would traverse a scan width on the drum in the fast scan direction. Photoreceptor 28 subsequently passes through a developing station 114, and a transfer station 116. A blank copy sheet 102 is passed in contact with photoreceptor 28 at transfer station 116. The drum then rotates past de-tack station (not shown) for removal of the copy sheet from the photoreceptor, and past cleaning station 118, where any remaining toner particles are removed, to prepare it for subsequent printing cycles. Once de-tack has taken place, the copy sheet with the developed image thereon then passes through fusing station 120 where the image becomes permanently affixed to the sheet. The reproduced copy of the original image is then transported from paper path 106 to an output tray (not shown).

Usable images are provided in that the information content of the location upon document 12 being scanned is represented by the modulated or variant intensity of light respective to its position within the scan width. As the scanning location traverses the charged surface, the electrostatic charge is dissipated in accordance with its light intensity. The electrostatic charge pattern thus produced is developed in the developing station and then transferred to the final copy paper.

Figure 3:
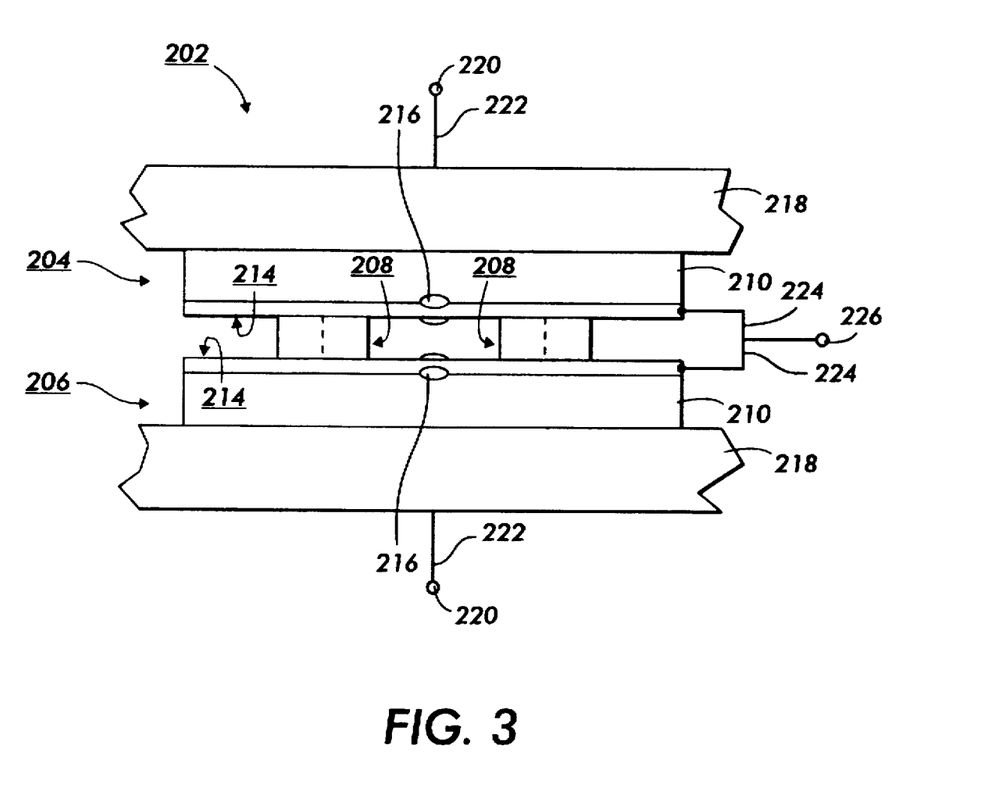
FIG. 3 depicts a multispot diode laser which can be properly aligned using the present invention.

Referring now to FIG. 3, one embodiment of laser source 20 is a multispot diode laser 202 which generally includes a plurality of semiconductor laser devices or dies 204 and 206, permanently affixed to one another via spacer members 208. While a dual beam diode laser is described here, those skilled in the art will appreciate that multispot diode lasers which include three or more dies (and thus emit three or more laser beams) may also be used, and the invention is not limited to dual beam devices. Each laser die 204 and 206 is comprised of multiple epitaxial layers deposited upon a semiconductor wafer. Further, each laser die includes a substrate layer 210 and a pn-junction 212. The pn-junction is located beneath the junction side 214 of the laser die, at a distance of less than 1 μm. The pn-junction further defines the center of the light emitting region 216 in the vertical direction.

Heatsinks 218 are also rigidly affixed to the substrate layer side of each laser die. Heatsinks 218 may be formed from copper or other heat conducting materials such as metalized beryllia (BeO), silicon, and diamond. During operation of the dual beam diode laser, the heatsinks serve not only to dissipate thermal energy generated by the laser dies, but also as electrical contacts to the substrate layers via electrical contacts 220 and conductors 222. On the opposite side of the laser dies, connected to a metalized layer deposited on the junction side of the die are a second set of electrical conductors, illustrated schematically by reference numeral 224, which in turn are connected to a common electrical ground via contact point 226. While not specifically shown, it is understood that the beam assembly would further include a base plate or similar mounting platform to which the heatsinks would be permanently affixed by a soldering or brazing technique, thereby securing the entire assembly in the closely spaced configuration depicted in FIG. 3. It is further understood that the base plate would also include electrically insulated feed-throughs which would provide power to the laser dies via the electrical contacts. Once the previously described elements are assembled, a cap, including a transparent window, would be placed over the elements and sealed to the base plate to encapsulate the dual beam laser assembly.

Figure 4A:
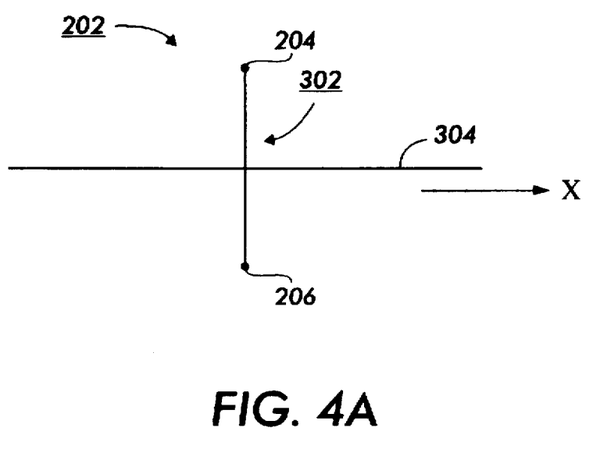
FIG. 4A contains a schematic illustration of the ideal alignment of multispot diodes in a raster output scanning system.
Figure 4B:
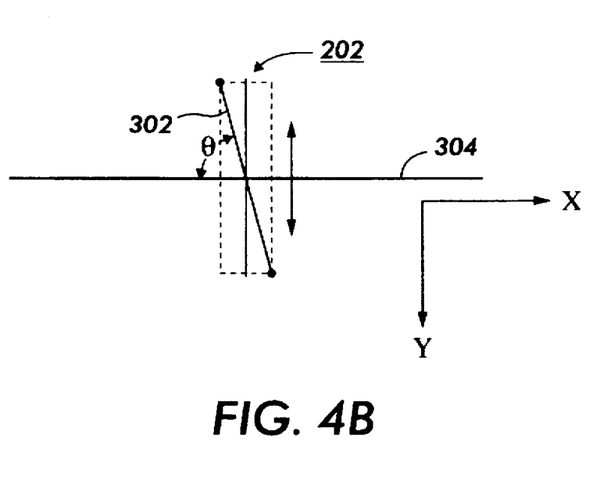
FIG. 4B illustrates the problem addressed by the present invention, as multispot diodes become misaligned creating distortions in the resulting printed image.

Turning now to FIG. 4A, ideally semiconductor laser dies 204 and 206 of multispot diode laser 202 would be aligned with axis 302 which connects dies 204 and 206 and oriented in the direction exactly orthogonal to the fast scan direction X, for scanning of imaging data across the surface of photoreceptor 28. Misalignment of semiconductor dies 204 and 206 causes rotation of axis 302 by angle θ with respect to direction X as depicted in FIG. 4B. This rotation creates distortion of the original image in direction X and also in direction Y, the slow scan direction in which imaging data is scanned down the photoreceptor to facilitate lengthwise reproduction. For the ideal case depicted in FIG. 4A, if the distance between dies 204 and 206 is defined as d, the displacement of dies 204 and 206 in the fast and slow scan directions are $d_x = d\cos\theta$, and $d_y = d\sin\theta$ respectively.

Further, when the laser is transmitted through ROS 10, the image undergoes magnification at different levels in orthogonal directions. Defining the magnification in the fast scan direction as $M_x$, and the magnification in the slow scan direction as $M_y$, the actual displacement of the image produced by misaligned multispot laser beams is $d_{fs} = d_x M_x$, and $d_{ss} = d_y M_y$ where $d_{fs}$ is the actual fast scan direction displacement, and $d_{ss}$ is the actual slow scan direction displacement. These true spacing values produce significant distortion of the image when the values of $M_x$ and $M_y$ are of substantially different magnitudes. In addition, the beam is astigmatic and its shape, which is typically an ellipse, is usually altered as it passes through a misaligned diode array, resulting in further distortion of the final image. Thus, it becomes imperative to eliminate the rotation of axis 302 if original images are to be accurately reproduced.

Figure 5:
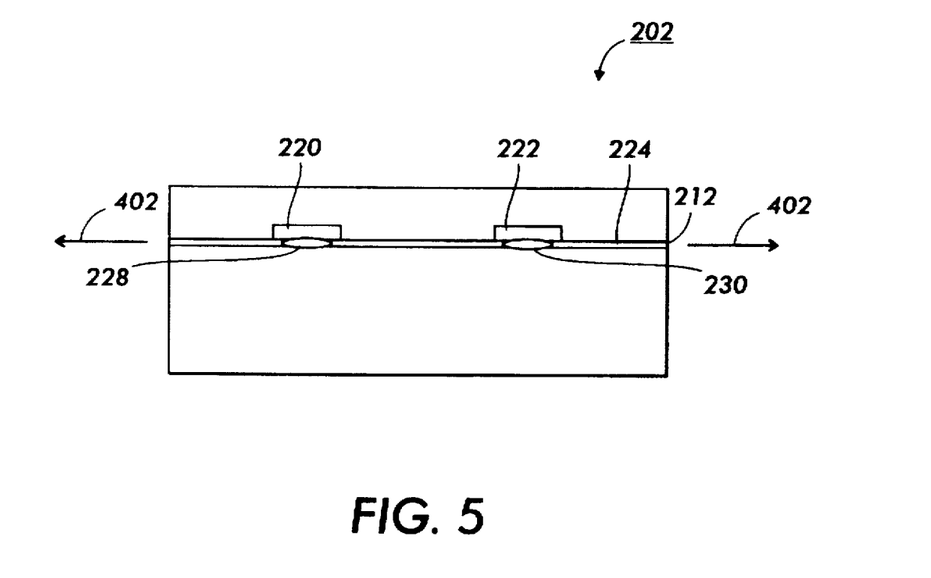
FIG. 5 depicts a close up view of a multispot diode, illustrating some of the results of the fabrication process.

The present invention includes an alignment procedure that actively selects the rotational orientation of axis 302. One embodiment of the invention includes aiming the laser beams by aligning laser polarization axis 402 relative to the axis of rotation of polygon 24. With reference to FIG. 5, the area of potential illumination by a given laser beam and which contains the imaging data is referred to as the optical field. Boxes 220 and 222 define the outer limits of its lateral or upper boundary. Light band 224 which extends across the entirety of diode laser 202 represents pn-junction 212. Ellipses 228 and 230 are shown to represent the light that is emitted under the stripes.

In FIG. 5, the transverse electric (TE) direction is indicated by double sided arrow A. The large anisotropy of the waveguide parallel and perpendicular to the pn-junction, causes almost all semiconductor lasers to emit light in a well defined polarization. Semiconductor devices may be polarized in either the transverse electric (TE) or the transverse magnetic (TM) direction. A TE device, is polarized in the plane of (and therefore, the electric field lies in the plane of) the pn-junction. This means that the TE polarization direction lies precisely parallel to inter-beam axis 304 (best shown in FIG. 3) at an equal distance between the two lasers. The polarization and electric field of a TM device is orthogonal to the pn-junction. This causes the TM polarization direction to lie parallel to axis 302 which connects dies 204 and 206, and orthogonal to inter-beam axis 304. On occasion, some laser structures will result in the polarization direction being slightly rotated with respect to inter-beam axis 304. As explained in detail below, diode laser 202 must be adjusted to account for such abnormalities to ultimately enable the polarization direction to be properly oriented with respect to the rotational axis of polygon 24.

While the present invention will primarily be described here in conjunction with a TE polarized laser device, those skilled in the art will recognize that it is possible to use the invention to align lasers that are polarized in the orthogonal transverse magnetic (TM) direction, and its use is not limited to this embodiment. In practicing the invention, it is important to note that when polarized light is emitted, the amount that actually passes through a polarizer will vary as the square of the cosine of the angle between the axis of the polarizer and the direction in which the light is polarized. Thus, when the polarization direction of the laser and the axis of the polarizer are at 90°, less than 1% of the light emitted from the laser will be transmitted through the polarizer. This fact is used to implement the present invention which includes a device that can detect proper alignment of diode laser 202 with respect to a polarizer by determining when the amount of light passing through the polarizer has been minimized.

Figure 6A:
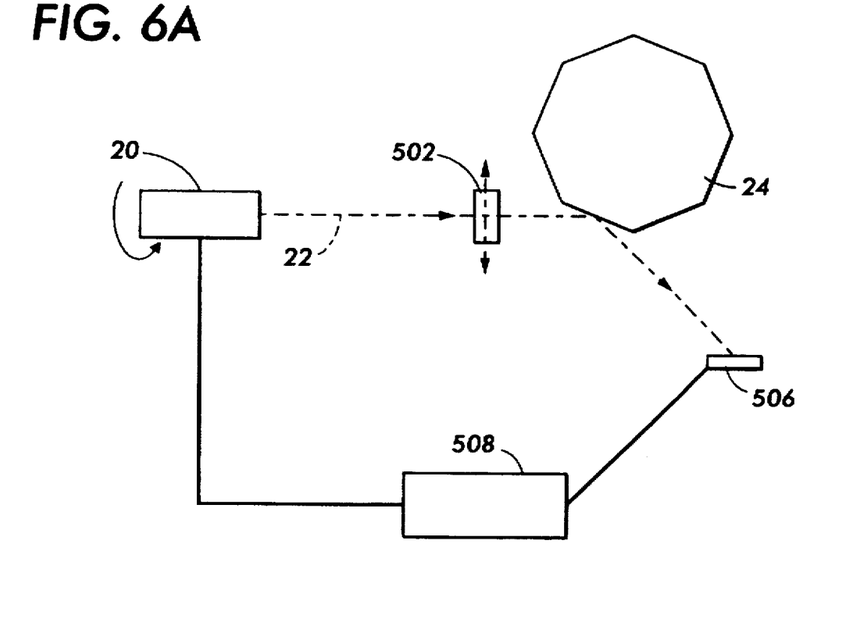
FIG. 6A is a view of a raster output scanning system with a transverse electric polarized multispot diode laser.
Figure 6B:
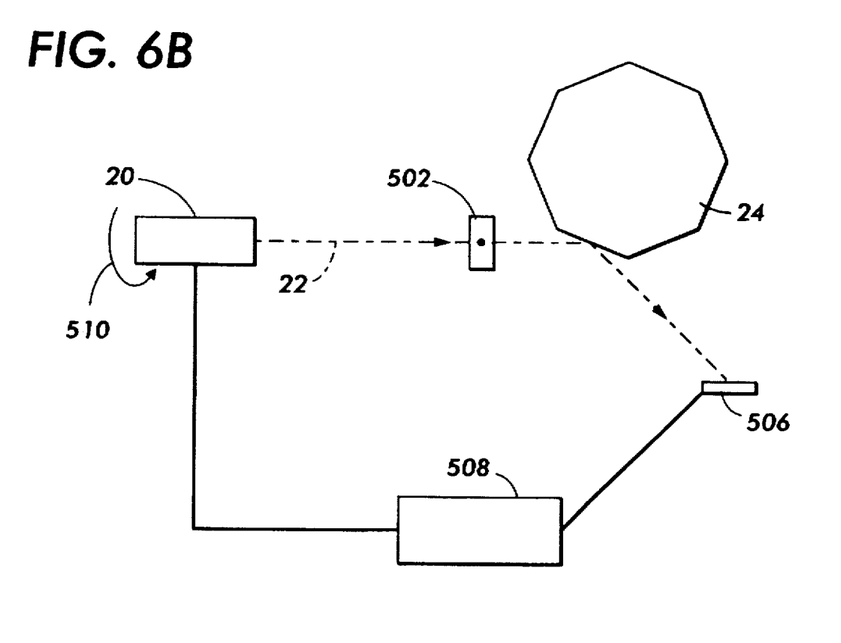
FIG. 6B contains an illustration of a raster output scanning system with a transverse magnetic polarized multispot diode laser.

Referring now to FIGS. 6A and 6B, it is first necessary to place a polarizer 502 in path 504 traveled by laser beam 22 as it strikes rotation polygon 24. Polarizer 502 should be oriented such that its axis is either perpendicular or parallel to the rotation axis of rotating polygon 24, depending on whether the diode lasers 202 are polarized in the TE direction or in the TM direction. Referring first to FIG. 6A, when a TE polarized diode laser 202 (which has a polarization direction parallel to the rotation axis of polygon 24) is present in ROS 10, the polarizer should be oriented perpendicular to the rotation axis of polygon 24 in path 504. When a TM polarized diode laser 202 (polarized in the direction normal to polygon 24) is used, the polarizer should be oriented parallel to the rotating polygon axis as shown in FIG. 6B. In this embodiment of the invention, the intensity of light reflected from the surface of rotation polygon 24 is measured at detector 506, and data indicative of this intensity is transmitted to feedback loop processor 508, for calculation of the adjustment that must be made to diode lasers 202 in order to obtain proper alignment. In other words, the absence of light at detector 506 means that multispot diode lasers 202 are properly aligned with respect to path 504, and successful imaging will take place. However, if any light is measured at detector 506, feedback loop processor 508 will receive a signal indicative thereof, causing diode lasers 202 to be rotated at laser rotation junction 510, the magnitude of the angle of rotation being dependent upon the intensity of the light transmitted through polarizer 502. In this manner, an alignment procedure that actively selects the proper rotational orientation of the laser may be effected.

While the above embodiment is described in a system that minimizes the amount of light transmitted to detector 506 when successful alignment has occurred, those skilled in the art will recognize that the invention may be used to indicate that such alignment has occurred when the intensity of light measured at detector 506 reaches is maximized. It is intended to embrace this and all other similar alternatives.

Figure 7:
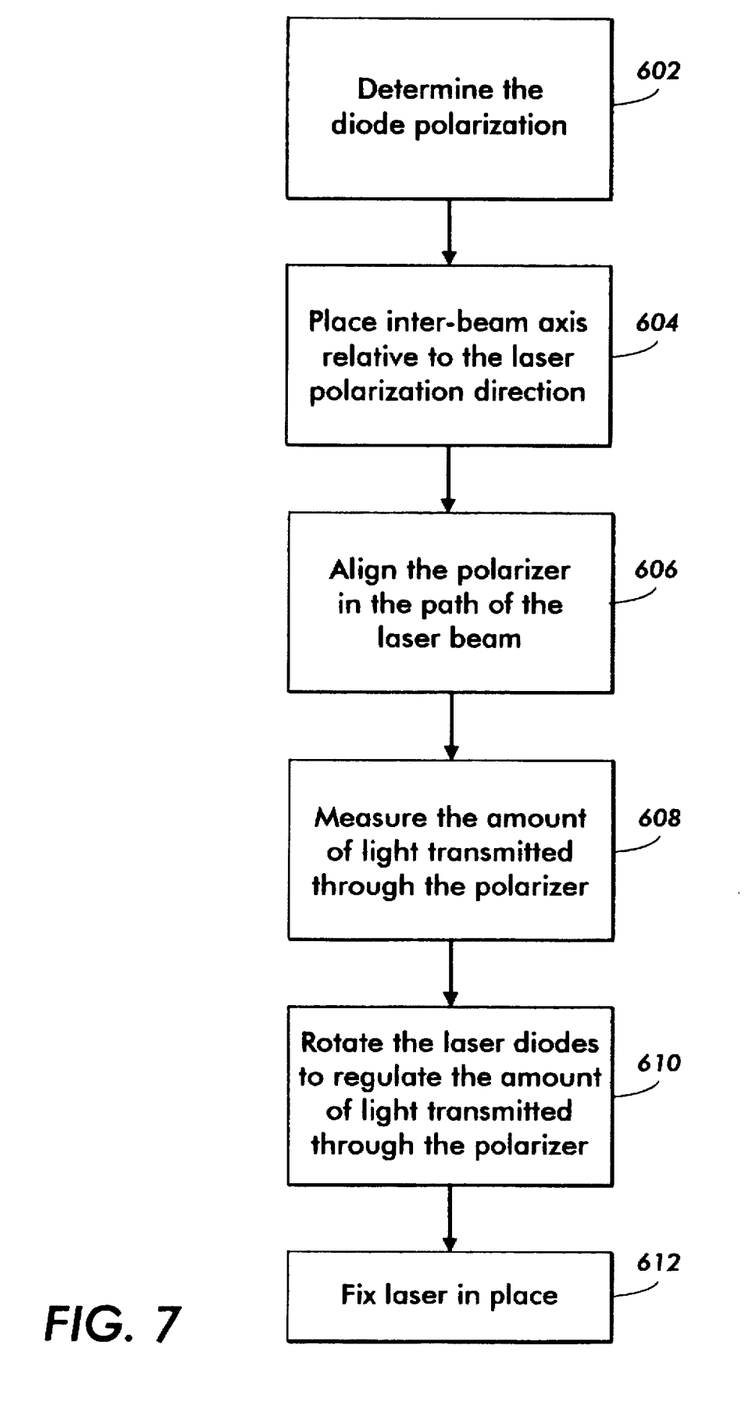
FIG. 7 contains a block diagram which indicates the steps required to practice the present invention, to properly align multispot diode lasers.

One implementation of the present invention is to include it in a process such as the one shown in the block diagram of FIG. 7. First step 602 requires measurement of the polarization of multispot diodes 202 to determine whether they are TE or TM polarized. Again, a TE polarized diode pair will typically be polarized in the direction orthogonal to axis 302, along inter-beam axis 304, which lies between the two dies 204 and 206, while a TM polarized diode pair will typically be polarized along axis 302.

Next, the relative positions of the polarization direction of the diode pair and the inter-beam axis 304 are verified at step 604 to insure that they are properly located with respect to each other as described above. That is, the direction in which a TE device is polarized must be exactly parallel to inter-beam axis 304, and the polarization direction of a TM device and inter-beam axis 304 must be exactly orthogonal. This relative positioning usually occurs as the device is manufactured. On those occasions when these criteria are not satisfied, the positioning of the diode pair must be adjusted until the polarization direction becomes properly aligned.

Once the polarization measurement has been made, step 606 requires alignment of polarizer 502 in path 504 in the appropriate direction, either orthogonal to or parallel to inter-beam axis 304, depending on the outcome of polarization measurement step 602. Since inter-beam axis of the diode pair is positioned relative to the rotational axis of polygon 24, this polarizer alignment will also result in polarizer 502 being aligned with respect to the rotation axis of polygon 24. However, on those occasions on which the laser polarization direction is not parallel to inter-beam axis 304, polarizer 502 will remain aligned with respect to the polarization direction and with respect to the rotation axis of polygon 24, to compensate for the location of inter-beam axis 304.

At step 608, light reflected from rotating polygon 24 is measured by detector 506. Data from detector 506 is then transmitted to feedback loop processor 508 at step 610. Feedback processor 508 will provide rotation of diode lasers 202, at a magnitude dependent upon the amount of light transmitted through the polarizer and measured at detector 506. This actuation and rotation will continue until the amount of light transmitted to photoreceptor 28 is minimized, thereby indicating that axis 302 which connects diode lasers 202 is properly oriented with respect to path 504 traveled by laser beam 22, and that diode lasers 202 are properly aligned for successful imaging. Laser 202 is fixed at the final step 612, thereby enabling successful imaging by the ROS.

The present invention will have advantageous use with numerous devices that require precise alignment of laser beam. Examples of such devices include but are not limited to the single pass color xerographic printing system disclosed in Kovacs U.S. Pat. No. 5,373,313 issued Dec. 13, 1994 which has a multiple wavelength diode laser source that images the multiple beams at a single station as closely spaced spots on a multiple layer photoreceptor. These multiple wavelength beams must be properly aligned if color images are to be successfully reproduced.

Another system that would be enhanced by the present invention is the single ROS system disclosed in Fisli U.S. Pat. No. 5,243,359 issued Sep. 7, 1993 which discloses a single ROS system including a rotating polygon mirror, and a single set of scan optics suitable for use in a multistation xerographic printer. A plurality of laser beams with varying wavelengths are deflected from a common mirror surface. Again, accurate alignment of these laser beams is required for successful imaging.

In addition, Kramer U.S. Pat. No. 5,097,351 issued Mar. 17, 1992 discloses a dual, simultaneous beam scanning system for simultaneously scanning two individually modulated adjacent scan lines on an internal drum imaging surface. Precise alignment of the two beams prior to their movement across the surface of the drum is required for accurate reproduction of images.

The contents of the above mentioned references are entirely incorporated by reference.

It is, therefore, apparent that there has been provided in accordance with the present invention, a method and apparatus for aligning multispot diode lasers that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of aligning a laser transmission device for use in a raster output scanner, comprising:
   a) determining a polarization direction of the laser transmission device;
   b) locating an inter-beam axis of the laser transmission device;
   c) aligning said inter-beam axis with respect to said polarization direction;
   d) mapping a path traveled by a laser beam as said beam is transmitted from the laser transmission device to a rotating polygon;
   e) placing a polarizer in said path in a direction dependent upon said polarization determination step, such that said polarizer is oriented orthogonal to said laser transmission device polarization direction;
   f) detecting a light intensity of said laser beam passing through said polarizer; and
   g) adjusting a rotational placement of the laser transmission device by an angle dependent upon said light intensity, thereby regulating a transmission of light through said polarizer to insure that the laser transmission device is properly aligned for imaging.

2. A method as claimed in claim 1 wherein said laser transmission device is a multispot diode laser.

3. A method as claimed in claim 2 wherein laser transmission device is polarized in a transverse electric direction.

4. A method as claimed in claim 3 wherein said aligning step includes insuring that said inter-beam axis and said polarization directions are parallel.

5. A method as claimed in claim 3 wherein a polygon rotation axis is parallel to said polarization direction.

6. A method as claimed in claim 2 wherein the laser transmission device polarized in a transverse magnetic direction.

7. A method as claimed in claim 6 wherein said aligning step includes insuring that said inter-beam axis and said polarization directions are orthogonal.

8. A method as claimed in claim 6 wherein a polygon rotation axis is orthogonal to said polarization direction.

9. An apparatus for aligning a laser transmission device for use in a raster output scanner, comprising:
   a) a rotating polygon with a reflective surface;
   b) a laser beam generating system, which produces a laser beam transmitted along a path from the laser transmission device to said rotating polygon;
   c) a polarizer placed in said path between the laser transmission device and said rotating polygon in a direction orthogonal to a polarization direction of the laser transmission device;
   d) a detector which measures an intensity of light transmitted through said polarizer;
   e) a processor which determines a required rotation of the laser transmission device to regulate said measured light intensity; and
   f) an actuator which performs said laser transmission device rotation.

10. An apparatus as claimed in claim 9 wherein the laser transmission device is a multispot diode laser having an inter-beam axis.

11. An apparatus as claimed in claim 10 wherein said multispot diode laser is polarized in a transverse electric direction.

12. An apparatus as claimed in claim 11 wherein said transmission device polarization direction is parallel to said inter-beam axis.

13. The apparatus of claim 11 wherein a polygon rotation axis lies parallel to said transmission device polarization direction.

14. An apparatus as claimed in claim 10 wherein said multispot diode laser is polarized in a transverse magnetic direction.

15. An apparatus as claimed in claim 14 wherein said transmission device polarization direction is orthogonal to said inter-beam axis.

16. The apparatus of claim 14 wherein a polygon rotation axis lies orthogonal to said polarization direction.

17. An apparatus for aligning a laser transmission device for use in a raster output scanner, comprising:
   a) means for determining a polarization direction of the laser transmission device;
   b) means for locating an inter-beam axis of the laser transmission device;

c) means for aligning said inter-beam axis with respect to said polarization direction;

d) means for mapping a path traveled by a laser beam as said beam is transmitted from the laser transmission device to a rotating polygon;

e) means for placing a polarizer in said path in a direction dependent upon said polarization determination step, such that said polarizer is oriented orthogonal to said laser transmission device polarization direction;

f) means for detecting a light intensity of said laser beam passing through said polarizer; and g) means for adjusting a rotational placement of the laser transmission device by an angle dependent upon said light intensity, thereby regulating transmission of light through said polarizer and insuring that the laser transmission device is properly aligned for imaging.

18. A method as claimed in claim 17 wherein said laser transmission device is a multispot diode laser.

19. A method as claimed in claim 18 wherein laser transmission device is polarized in a transverse electric direction.

20. A method as claimed in claim 18 wherein the laser transmission device polarized in a transverse magnetic direction.

* * * * *